(12) United States Patent
Driscoll et al.

(10) Patent No.: US 8,486,341 B2
(45) Date of Patent: Jul. 16, 2013

(54) SYSTEM AND METHOD FOR TREATING EXHAUST GASES

(75) Inventors: James Joshua Driscoll, Dunlop, IL (US); Michael A. Flinn, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1090 days.

(21) Appl. No.: 12/331,065

(22) Filed: Dec. 9, 2008

(65) Prior Publication Data

US 2010/0139257 A1 Jun. 10, 2010

(51) Int. Cl.
*B01D 50/00* (2006.01)
*B01D 53/34* (2006.01)
*F01N 3/00* (2006.01)

(52) U.S. Cl.
USPC .............. 422/177; 422/170; 422/180; 60/286

(58) Field of Classification Search
USPC ................ 60/286; 422/168, 170, 177, 180
See application file for complete search history.

(56) References Cited

U.S. PATENT DOCUMENTS

| | | | |
|---|---|---|---|
| 5,643,536 A | 7/1997 | Schmelz | |
| 5,849,593 A | 12/1998 | Schmelz | |
| 6,532,736 B2 | 3/2003 | Hammerle et al. | |
| 6,996,975 B2 * | 2/2006 | Radhamohan et al. | 60/286 |
| 7,093,427 B2 | 8/2006 | van Nieuwstadt et al. | |
| 7,485,272 B2 * | 2/2009 | Driscoll et al. | 423/213.2 |
| 7,562,522 B2 * | 7/2009 | Yan | 60/286 |
| 7,607,291 B2 * | 10/2009 | Driscoll et al. | 60/286 |
| 7,669,408 B2 * | 3/2010 | McCarthy et al. | 60/286 |
| 7,805,929 B2 * | 10/2010 | Driscoll | 60/286 |
| 7,811,527 B2 * | 10/2010 | Robel et al. | 422/180 |
| 2005/0247050 A1 | 11/2005 | Kaboord et al. | |
| 2006/0260296 A1 | 11/2006 | Theis | |
| 2007/0028601 A1 | 2/2007 | Duvinage et al. | |
| 2007/0044457 A1 | 3/2007 | Upadhyay et al. | |
| 2007/0048204 A1 | 3/2007 | Mital | |
| 2007/0074506 A1 | 4/2007 | Driscoll et al. | |
| 2007/0289288 A1 | 12/2007 | Dawson et al. | |
| 2008/0066453 A1 | 3/2008 | Oberski et al. | |
| 2008/0069750 A1 | 3/2008 | Oberski et al. | |
| 2008/0095682 A1 | 4/2008 | Kharas et al. | |
| 2008/0102010 A1 | 5/2008 | Bruck et al. | |

\* cited by examiner

*Primary Examiner* — Nina Bhat
(74) *Attorney, Agent, or Firm* — Miller, Matthias & Hull

(57) ABSTRACT

Systems and methods for treating exhaust gases are described. The described systems and/or methods for treating exhaust gases could be used with any power plant, engine, hydrocarbon burning system, other $NO_x$ producing system, or combinations thereof. A method (400) for treating exhaust gases is provided. The method (400) may include converting (402) ammonia (44) and $NO_x$ to nitrogen and water using an ammonia-SCR catalyst (30) after converting (404) ammonia to $NO_x$ using an ammonia-to-$NO_x$ catalyst (20) located upstream of at least a portion of the ammonia-SCR catalyst (30). The described systems and/or methods create $NO_x$ so excess ammonia added to the exhaust stream may be used to convert $NO_x$ to nitrogen and water.

14 Claims, 5 Drawing Sheets

SYSTEM AND METHOD FOR TREATING EXHAUST GASES

TECHNICAL FIELD

This disclosure generally relates to exhaust systems and more particularly to a system and method for treating exhaust gases.

BACKGROUND

Power plants, such as some furnaces, internal and external combustion engines, or other hydrocarbon burning devices may emit pollutants such as carbon monoxides, nitrogen oxides ($NO_x$, including NO and $NO_2$), particulate matters, and sulfur oxides, to name a few. During the combustion process of these engines or fuel-burning plants, fuel ignites in the presence of oxygen. If excess oxygen is present, the local mixture is lean, and the combustion usually results in the emission of increased $NO_x$. If excess fuel is present, the local mixture is rich, and the combustion will result in the emission of unburned hydrocarbon, soot, soluble organic fraction (SOF), and sulfates, generally termed particulate matter. Consequently, most engines emit a mixture of $NO_x$ and particulate matter.

Emission of many of these pollutants is regulated by governmental agencies, which mandate that engines—along with other fuel-burning plants—not exceed certain maximum limitations. In meeting these regulations, engine manufacturers are challenged with designing engines that both meet stringent exhaust regulations as well as provide fuel-efficient power conversion. Additionally, engine manufacturers may have to design engines that meet all of the regulations for the several different types of exhaust pollutants.

One approach to reducing $NO_x$, for instance, includes using ammonia as a reductant or reducing agent for use with a Selective Catalytic Reduction (SCR) catalyst. This process reduces the $NO_x$ to gaseous nitrogen and water. However, some ammonia based systems may produce excess ammonia (for example, more ammonia than the system is capable of reacting and/or storing).

One proposed solution to dealing with excess ammonia is described in U.S. Pat. Pub. No. 2007/0289288 to Dawson et al. ("Dawson"). Dawson purports to disclose a "system and method for venting an on-board vehicle emissions treatment substance storage and distribution system that . . . coupl[es] the storage tank to the exhaust system upstream of an ammonia storage element to reduce and direct any escaping ammonia toward the rear of the vehicle away from a refueling location." However, the capacity of the ammonia storage element may be limited.

BRIEF SUMMARY

In an example embodiment, a method for treating exhaust gases is provided. The method includes converting a first quantity of ammonia using an ammonia-SCR catalyst to produce gaseous nitrogen and water and converting a second quantity of ammonia using an ammonia-to-$NO_x$ catalyst located upstream of at least a portion of the ammonia-SCR catalyst to produce $NO_x$.

In another example embodiment, an exhaust system is provided. The exhaust system includes a conduit configured to receive combustion products from an engine. An ammonia-to-$NO_x$ catalyst is in fluid communication with the conduit. A first ammonia inlet is disposed upstream of at least a portion of the ammonia-to-$NO_x$ catalyst and is configured to receive ammonia from an ammonia source. An ammonia-SCR catalyst is in fluid communication with and disposed downstream from the ammonia-to-$NO_x$ catalyst. A second ammonia inlet is disposed downstream of the ammonia-to-$NO_x$ catalyst and upstream of at least a portion of the ammonia-SCR catalyst and is configured to receive ammonia from the ammonia source.

In a further example embodiment, an exhaust system for treatment of exhaust gases is provided. The system includes an ammonia-to-$NO_x$ catalyst disposed within the exhaust system. An ammonia-SCR catalyst is in fluid communication with and disposed downstream from the ammonia-to-$NO_x$ catalyst. An ammonia source is in selective fluid communication with the exhaust system upstream of at least a portion of the ammonia-to-$NO_x$ catalyst through a first fluid conduit. The ammonia source is further in selective fluid communication with the exhaust system downstream of the ammonia-to-$NO_x$ catalyst and upstream of at least a portion of the ammonia-SCR catalyst through a second fluid conduit.

Figure 1:
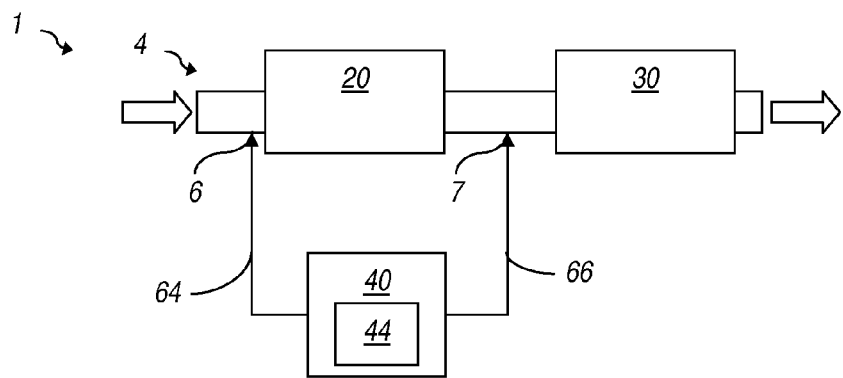
FIG. 1 is a diagrammatic illustration of an exhaust system according to an example embodiment of the present disclosure.

It should be noted that the figures are not drawn to scale and that elements of similar structures or functions are generally represented by like reference numerals for illustrative purposes throughout the figures. It also should be noted that the figures are only intended to facilitate the description of embodiments of the present disclosure.

DETAILED DESCRIPTION

Reducing the amount of ammonia that may exit an exhaust system as ammonia may be desirable in any exhaust system that uses ammonia to reduce emissions of $NO_x$. Consequently, the systems and/or methods described herein may be used in an exhaust system that includes an ammonia salt, liquid ammonia, other ammonia source, or combinations thereof.

FIG. 1 is a diagrammatic illustration of an exhaust system 1 according to an example embodiment. The exhaust system 1 includes a conduit 4 that is in fluid communication with an ammonia-to-$NO_x$ catalyst 20 and an ammonia-SCR catalyst 30. A first inlet 6, with associated first fluid conduit 64, and a second inlet 7, with associated second fluid conduit 66, receive ammonia 44 from an ammonia source 40 and aid with delivering or directing ammonia toward conduit 4. As illustrated, the first inlet 6 may be located upstream of at least a portion of the ammonia-to-$NO_x$ catalyst 20 and the second inlet 7 may be located upstream of at least a portion of the ammonia-SCR catalyst 30.

As illustrated, an engine or other exhaust source may introduce an exhaust into the conduit 4. The exhaust may include various exhaust components such as $NO_x$. Although an engine is described, the disclosed system for treating exhaust gas may apply to any exhaust streams where unwanted $NO_x$ is present. For example, the disclosed systems may be used with hydrocarbon fueled power plants.

The exhaust may pass through the conduit 4 and over and/or through the ammonia-to-$NO_x$ catalyst 20. The ammonia-to-$NO_x$ catalyst 20 may be used to convert at least a portion of the components of the exhaust. For instance, the ammonia-to-$NO_x$ catalyst 20 may be used to convert hydrocarbons (HC) and/or carbon monoxide (CO) to carbon dioxide ($CO_2$) and water.

Following exiting the ammonia-to-$NO_x$ catalyst 20, the exhaust, including components converted using the ammonia-to-$NO_x$ catalyst 20, may pass through the conduit 4 and over and/or through the ammonia-SCR catalyst 30. Ammonia 44 may be directed to the ammonia-SCR catalyst 30 through second inlet 7, with associated second fluid conduit 66. The ammonia-SCR catalyst 30 may be used to convert the ammonia 44 and at least a portion of the components of the exhaust. For instance, the ammonia-SCR catalyst 30 may be used to convert $NO_x$ using the ammonia 44 to produce gaseous nitrogen ($N_2$), water, other non-nitrogen oxide components, or combinations thereof. The ammonia-SCR catalyst 30 may store ammonia 44 that is not converted with the $NO_x$. For instance, the ammonia 44 may be adsorbed onto the surface of the ammonia-SCR catalyst 30.

If the ammonia source 40 produces more ammonia 44 than the ammonia-SCR catalyst 30 is capable of storing, converting, consuming, otherwise preventing exhausting, or combinations thereof, the excess ammonia 44 may be directed upstream of at least a portion of the ammonia-to-$NO_x$ catalyst 20 through first inlet 6, with associated first fluid conduit 64. At least a portion of the ammonia 44 directed to the ammonia-to-$NO_x$ catalyst 20 may be converted to $NO_x$. This reduces the amount of excess ammonia 44 within the system 100 that may exit the exhaust system as ammonia.

Excess ammonia may be generated in the event an exhaust component malfunctions. For instance, if a fire or other catastrophe occurs, excess ammonia may be generated resulting again in a pressure and/or temperature near the ammonia source exceeding a threshold.

The system 1 described in connection with FIG. 1 may incorporate at least one component of the systems 100, 200, 300 described in connection with FIGS. 2-4. The following non-limiting list of examples indicates the interchangeability of at least some of the components of the systems 1, 100, 200, 300 described herein. For instance, the ammonia-to-$NO_x$ catalyst 20 may be incorporated into a diesel oxidation catalyst (shown in FIG. 3) or a catalyzed diesel particulate filter (shown in FIG. 4). In another example, the excess ammonia 44 may be directed through a third fluid conduit (shown in FIGS. 2-4). In a further example, the ammonia source 40 may include liquid ammonia (shown in FIG. 3) and/or ammonia salts (shown in FIG. 4).

The system 1 may incorporate at least one act described in connection with FIGS. 5-7. The following non-limiting list of examples indicates the interchangeability of at the acts of the methods 400, 500, 600 described herein. For instance, the ammonia-to-$NO_x$ catalyst 20 may be used to convert a quantity (such as a second quantity) of ammonia 44 to produce $NO_x$. In another example, an electronic control device (shown in FIGS. 2-4) may determine an approximate initial storage capacity of the ammonia-SCR catalyst 30.

Figure 2:
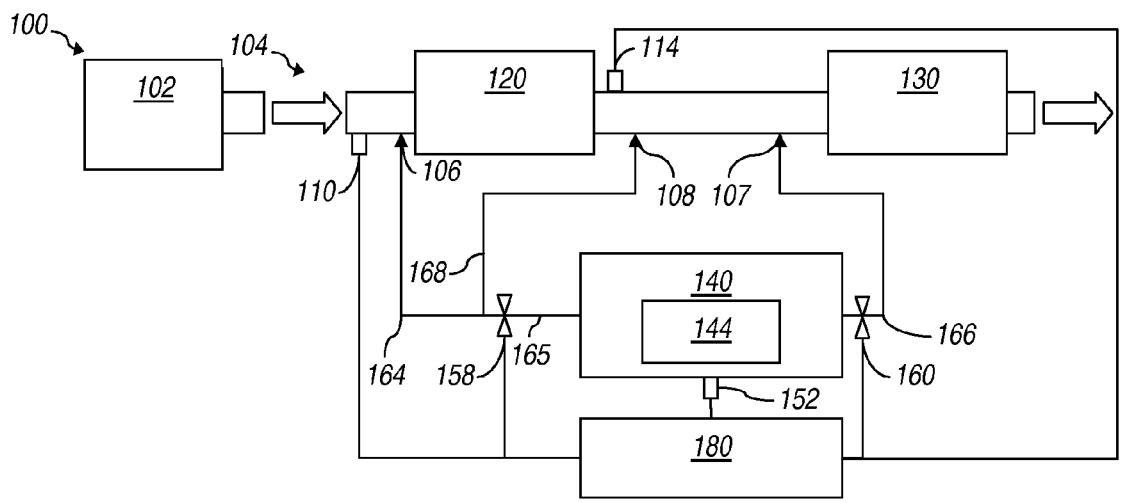
FIG. 2 is a diagrammatic illustration of an exhaust system according to another example embodiment of the present disclosure.

FIG. 2 is a diagrammatic illustration of an exhaust system 100 according to another example embodiment. The exhaust system 100 of this other embodiment may be functionally similar to the exhaust system 1 previously described above and shown in FIG. 1 in most respects, wherein certain features will not be described in relation to this embodiment wherein those components may function in the manner as described above and are hereby incorporated into this alternative embodiment described below. Like structures and/or components may be given like reference numerals. Additionally, the exhaust system 100 may incorporate at least one component of the systems 200, 300 and/or perform or be used to perform at least one act of the methods 400, 500, 600 described below in connection with FIGS. 3-4 and 5-7, respectively.

The illustrated exhaust system 100 includes an ammonia-to-$NO_x$ catalyst 120, an ammonia-SCR catalyst 130, and an ammonia source 140. The exhaust system 100 may also include a conduit 104 in fluid communication with an engine 102 to direct exhaust components from the engine 102 into the exhaust system 100 for reduction of $NO_x$. Exhaust passes over and/or through the ammonia-to-$NO_x$ catalyst 120 and the ammonia-SCR catalyst 130 before exiting the exhaust system 100.

In some embodiments, the exhaust system 100 may include an electronic control device 180 to control one or more functions of the exhaust system 100, such as, but not limited to, delivering or directing quantities of ammonia from the ammonia source 140 toward the ammonia-SCR catalyst 130 to reduce $NO_x$ and to ammonia-to-$NO_x$ catalyst 120 to convert ammonia to $NO_x$ when the ammonia source 140 produces excess ammonia. The engine 102 may introduce an exhaust into the conduit 104 that may include various exhaust components such as $NO_x$.

The conduit 104 may be in fluid communication with the ammonia-to-$NO_x$ catalyst 120, the ammonia-SCR catalyst 130, other exhaust system components, or combinations thereof. As mentioned above, the ammonia-to-$NO_x$ catalyst 120 may be configured to convert or aid in the conversion of at least a portion of ammonia 144 introduced to the ammonia-to-$NO_x$ catalyst 120 into $NO_x$. The ammonia-to-$NO_x$ catalyst 120 may be incorporated into a diesel oxidation catalyst, a catalyzed diesel particulate filter, other exhaust system components having at least one catalyst, or combinations thereof. The ammonia-to-$NO_x$ catalyst 120 may include materials such as platinum, palladium, rhodium, other platinum group metals, other materials of comparable functionality, such as, but not limited to, materials capable of aiding in converting ammonia to $NO_x$, or combinations thereof.

The ammonia-to-$NO_x$ catalyst 120 may be in fluid communication with and upstream of the ammonia-SCR catalyst 130 which may be configured to convert or aid in the conversion of at least a portion of any $NO_x$ downstream of the ammonia-to-$NO_x$ catalyst 120 and at least a portion of any ammonia 144 introduced to the ammonia-SCR catalyst 130 into gaseous nitrogen, water, other non-nitrogen oxide components, or combinations thereof. The illustrated ammonia-SCR catalyst 130 may include a urea-SCR catalyst. Urea-SCR catalysts may use urea (a mixture of water and ammonia) to reduce $NO_x$. The ammonia-SCR catalyst 130 may include materials such as indium, copper, silver, zinc, cadmium, cerium, cobalt, nickel, iron, molybdenum, tungsten, titanium, vanadium, zirconium, oxides thereof, alloys thereof, other materials of comparable functionality, such as, but not limited to, materials capable of aiding in converting ammonia and $NO_x$, or combinations thereof. The catalyst materials may be supported by alumina, silica, zeolites, other materials of comparable functionality, such as, but not limited to, materials capable of aiding in converting ammonia and $NO_x$, or combinations thereof.

As mentioned, the ammonia source 140 includes ammonia 144. The ammonia 144 may be in gaseous, liquid, mixture, other forms, or combinations thereof. For instance, the ammonia 144 may be stored in an ammonia salt, in a urea solution, in gaseous form, in other forms, or combinations thereof.

The ammonia source 140 may be in fluid communication with the ammonia-to-$NO_x$ catalyst 120 and/or ammonia-SCR catalyst 130 through at least one ammonia inlet 106, 107, 108 and associated at least one fluid conduit 164, 166, 168. These inlets 106, 107, 108 and conduits 164, 166, 168 facilitate delivery of ammonia to ammonia-to-$NO_x$ catalyst 120 and/or ammonia-SCR catalyst 130 for $NO_x$ reduction and to provide a conduit for ammonia 144 in excess of that used to reduce $NO_x$.

The ammonia source 140 may be in fluid communication with the ammonia-to-$NO_x$ catalyst 120 through the first ammonia inlet 106 located upstream of at least a portion of the ammonia-to-$NO_x$ catalyst 120. As illustrated, the first ammonia inlet 106 is disposed within conduit 104. In another configuration, the first ammonia inlet 106 may be positioned at some location along the length of the ammonia-to-$NO_x$ catalyst 120. The ammonia source 140 may be in fluid communication with the ammonia-SCR catalyst 130 through the second ammonia inlet 107 and/or the third ammonia inlet 108. The second ammonia inlet 107 may be located upstream of at least a portion of the ammonia-SCR catalyst 130. As illustrated, the second ammonia inlet 107 is disposed within conduit 104. In another configuration, the second ammonia inlet 107 may be positioned at some location along the length of ammonia-SCR catalyst 130. The third ammonia inlet 108 may be located upstream of at least a portion of the ammonia-SCR catalyst 130. The second ammonia inlet 107 and third ammonia inlet 108 may be located approximately the same or different locations within the conduit and/or ammonia-SCR catalyst 130.

The ammonia source 140 may be in selective fluid communication with the first ammonia inlet 106 through a first fluid conduit 164. The ammonia source 140 may be in selective fluid communication with the second ammonia inlet 107 through a second fluid conduit 166. The ammonia source 140 may be in selective fluid communication with the third ammonia inlet 108 through a third fluid conduit 168. The first fluid conduit 164, the second fluid conduit 166, the third fluid conduit 168, or combinations thereof may include piping, tubing, hose, other types of fluid conduits, or combinations thereof.

Fluid communication through the fluid conduits 164, 166, 168 may be regulated using at least one valve 158, 160 or other fluid regulator. For instance, fluid communication between the ammonia source 140 and the second ammonia inlet 107 via the second fluid conduit 166 may be regulated by the second valve 160 so that a controlled quantity of ammonia is metered into the conduit 104 for use by the ammonia-SCR catalyst 130 in $NO_x$ reduction. Fluid communication between the ammonia source 140 and the first and/or third ammonia inlet 106, 108 via the first and/or third fluid conduit 164, 168 may be regulated by the first valve 158 which allows passage of quantities of ammonia 144 in excess of that delivered to or directed to the ammonia-SCR catalyst 130 for $NO_x$ reduction, such as when the ammonia source 140 produces or generates excess ammonia. In another example, fluid communication between the ammonia source 140 and the first and third ammonia inlet 106, 108 via the first and third fluid conduit 164, 168 may be regulated by a plurality of valves. As shown in FIG. 3, an additional valve may regulate fluid communication between the ammonia source 140 and the third inlet 108 separately from the first valve 158.

The first valve 158 and/or the second valve 160 may be mechanically controlled, electrically controlled, otherwise controlled, or combinations thereof For example, the second valve 160 may include a mechanical valve configured to meter the flow of ammonia 144 to the ammonia-SCR catalyst 130. A mechanical valve may meter based on pressure, temperature, other environmental characteristics, other metrics, or combinations thereof. In another example, the first and/or second valve 158, 160 may include a solenoid valve. The solenoid valve may be biased to remain open or closed depending on the desired default position. For example, the first valve 158 may be biased to remain open in a default position. In another example, the second valve 160 may be biased to close in a default position.

In some embodiments, the valves 158, 160 may be in electronic communication with the electronic control device 180. The electronic control device 180 may be in further electronic communication with a first sensor 110, a second sensor 114, a third sensor 152, or combinations thereof which measure pressure, temperature, flow rate, or various other exhaust or ammonia characteristics.

The first and/or second sensors 110, 114, for example, may measure and/or report on exhaust/ammonia characteristics at various locations within the exhaust flow. These characteristics can include, but are not limited to, pressure, temperature, humidity, flow characteristics, other characteristics, or combinations thereof.

The first sensor 110 may be located upstream of at least a portion of the ammonia-to-$NO_x$ catalyst 120. As illustrated, the first sensor 110 is disposed on and/or within the conduit 104. In another configuration, the first sensor may be may be located upstream of at least a portion of the first ammonia inlet 106, along the length of the ammonia-to-$NO_x$ catalyst 120, or other locations. The second sensor 114 may be located upstream of at least a portion of the ammonia-SCR catalyst 130 and downstream of the ammonia-to-$NO_x$ catalyst 120. As illustrated, the second sensor 114 may be located upstream of the second ammonia inlet 107 and upstream of the third ammonia inlet 108. In another configuration, the second sensor 114 may be located upstream and/or downstream of the second ammonia inlet 107 and/or upstream and/or downstream of the third ammonia inlet 108

The third sensor 152 may, for example, measure and/or report characteristics near the ammonia source 140 to, for example, the electronic control device 180. For example, the third sensor 152 may measure and/or report on pressure, temperature, humidity, flow characteristics, other characteristics, or combinations thereof.

In embodiments where at least one valve 158, 160 is at least partially electronically controlled, the electronic control device 180 may regulate at least one valve 158, 160 based on at least one measurement determined by at least one of the sensors 110, 114, 152. For example, the second valve 160 may be regulated based on a measurement, such as pressure and/or temperature, for example, from the third sensor 152, a measurement from the second sensor 114, a measurement from the first sensor 110, other metrics, or combinations thereof. Other valves may be similarly, and/or otherwise regulated.

In embodiments with a first fluid conduit 164 and a third fluid conduit 168 to deliver ammonia 144 from the ammonia source 140 to the ammonia-to-NO$_x$ catalyst 120 and/or the conduit 104, a connecting fluid conduit 165 may extend from the valve 158 to the ammonia source 140. For example, the first fluid conduit 164 and the third fluid conduit 168 may be connected by a tee joint (not shown) that is in turn connected to the ammonia source 140 by the connecting fluid conduit 165. The connecting fluid conduit 165 may facilitate directing ammonia quantities into the exhaust system 100. For example, if the first valve 158 releases a quantity of ammonia, such as ammonia in excess of that typically used by the ammonia-SCR catalyst 130 to reduce NO$_x$ in the exhaust, the first and/or third fluid conduits 164, 168 may be configured to divide the flow of ammonia into the exhaust system based on a predetermined flow rate. It can be understood that the connecting fluid conduit 165 may be replaced by a portion of the first fluid conduit 164 such that the third fluid conduit 168 splits off (i.e. via a tee-joint or otherwise) from the first fluid conduit 164. The reverse is also possible, i.e., the first fluid conduit 164 may extend from the third fluid conduit 168. In these cases, the first fluid conduit 164 and the third fluid conduit 168 may extend from the ammonia source 140 with or without the inclusion of the connecting fluid conduit 165.

Figure 3:
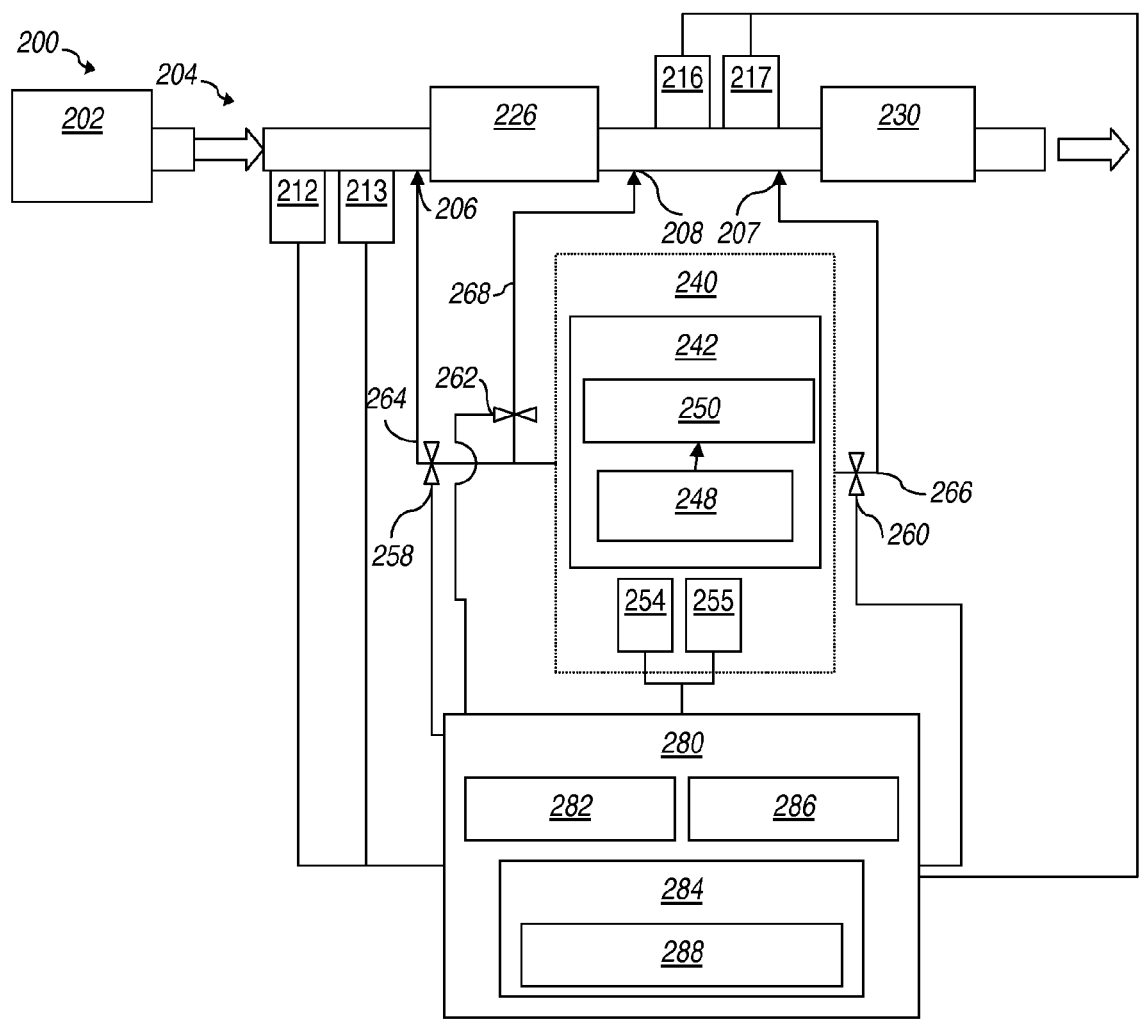
FIG. 3 is a diagrammatic illustration of an exhaust system according to a further example embodiment of the present disclosure.

Turning now to FIG. 3, illustrated is a diagrammatic illustration of an exhaust system 200 according to a further example embodiment. The exhaust system 200 of this other embodiment may be functionally similar to the exhaust systems 1, 100 previously described above and shown in FIGS. 1-2 in most respects, wherein certain features will not be described in relation to this embodiment wherein those components may function in the manner as described above and are hereby incorporated into this alternative embodiment described below. Like structures and/or components may be given like reference numerals. Additionally, the exhaust system 200 may incorporate at least one component of the system 300 and/or perform or be used to perform at least one act of the methods 400, 500, 600 described below in connection with FIGS. 4 and 5-7, respectively.

The illustrated exhaust system 200 includes a diesel oxidation catalyst 226, an ammonia-SCR catalyst 230, and an ammonia source 240. The exhaust system 200 may also include a conduit 204 in fluid communication with an engine 202 to direct exhaust components from the engine 202 into the exhaust system 200 for reduction of NO$_x$. Exhaust passes over and/or through the diesel oxidation catalyst 226 and the ammonia-SCR catalyst 230 before exiting the exhaust system 100.

In some embodiments, the exhaust system 200 may include an electronic control device 280 to control one or more functions of the exhaust system 200. The electronic control device 280 may be similar to electronic control device 180 of exhaust system 100. As such, the electronic control device 280 can control delivery or directing of quantities of ammonia from the ammonia source 240 toward the ammonia-SCR catalyst 230 to reduce NO$_x$ and to diesel oxidation catalyst 226 to convert ammonia to NO$_x$ when the ammonia source 240 produces ammonia in excess of that used by the ammonia-SCR catalyst 230 to reduce NO$_x$ in the exhaust from the engine 202.

The conduit 204 may be in fluid communication with the diesel oxidation catalyst 226, the ammonia-SCR catalyst 230, other exhaust system components, or combinations thereof. The diesel oxidation catalyst 226 may be disposed downstream from the engine 202 or other NO$_x$ source.

The ammonia source 240 may include an ammonia storage vessel 242 that may store liquid ammonia 248, gaseous ammonia 250, other elements, other gaseous emissions produced from the liquid ammonia 248, or combinations thereof. In some embodiments, the ammonia source 240 may include a heat source (shown as 356 in FIG. 4). The liquid ammonia 248 within the ammonia storage vessel 242 may include liquid urea. Ammonia may be delivered to the exhaust system 200 in various forms. For example, the ammonia may be delivered as liquid ammonia 248, gaseous ammonia 250, in other forms, or combinations thereof.

The ammonia source 240 may be in fluid communication with the conduit 204 through at least one ammonia inlet 206, 207, 208 and associated with at least one fluid conduit 264, 266, 268. The first ammonia inlet 206 may be located upstream of at least a portion of the diesel oxidation catalyst 226. As illustrated, the first ammonia inlet 206 is disposed within conduit 204. In another configuration, the first ammonia inlet 206 may be positioned at some location along the length of the diesel oxidation catalyst 226. The second ammonia inlet 207 may be located upstream of at least a portion of the ammonia-SCR catalyst 230. The third ammonia inlet 208 may be located upstream of at least a portion of the ammonia-SCR catalyst 230.

The diesel oxidation catalyst 226 may be configured to reduce carbon monoxide, hydrocarbons, other exhaust components, or combinations thereof to carbon dioxide, water, other components, or combinations thereof. The diesel oxidation catalyst 226 may further be configured to convert or aid in the conversion of at least a portion of the ammonia introduced to the diesel oxidation catalyst 226 into NO$_x$. For example, the diesel oxidation catalyst 226 may be used to convert the ammonia to NO or NO$_2$ when ammonia source 240 produces or generates quantities of ammonia in excess of the ammonia delivered or directed to ammonia-SCR catalyst 230 for NO$_x$ reduction. The ammonia introduced to the diesel oxidation catalyst 226 may be delivered generally as gaseous ammonia 250. In some embodiments, the ammonia introduced to the diesel oxidation catalyst 226 may be delivered as liquid ammonia 248 and/or gaseous ammonia 250. The diesel oxidation catalyst 226 may include materials such as platinum, palladium, rhodium, other platinum group metals, other materials of comparable functionality, such as, but not limited to, materials capable of aiding in converting ammonia to NO$_x$, or combinations thereof.

The diesel oxidation catalyst 226 may also be in fluid communication with the ammonia-SCR catalyst 230. The ammonia-SCR catalyst 330 may include a urea-SCR catalyst. The remaining exhaust may pass over and/or through the ammonia-SCR catalyst 230 before exiting the exhaust system 200.

Fluid communication through the fluid conduits 264, 266, 268 may be regulated using at least one valve 258, 260, 262 or other fluid regulator. The valves 258, 260, 262 and/or the configuration of fluid conduits 264, 266, 268, such as diameter, cross-sectional configuration, etc., can regulate ammonia delivered to the conduit 204, the diesel oxidation catalyst 226, and/or the ammonia-SCR catalyst 230 for exhaust NO$_x$ reduction and/or conversion of excess ammonia to NO$_x$. Fluid communication between the ammonia source 240 and the first ammonia inlet 206 via the first fluid conduit 264 may be regulated by the first valve 258. Fluid communication between the ammonia source 240 and the third ammonia inlet 208 via the third fluid conduit 268 may be regulated by the third valve 262.

The use of a first valve 258 and a third valve 262 may allow predetermined and/or adjustable quantity of ammonia to be directed into the exhaust system 200 through the first and third fluid conduits 264, 268. For example, the first valve 258 may allow a first quantity of ammonia to be directed upstream of at least a portion of the ammonia-to-NO$_x$ catalyst 220 and the third valve 262 may allow a third quantity of ammonia to be directed upstream of at least a portion of the ammonia-SCR catalyst 230.

The first valve 258 may be used to direct the ammonia to the diesel oxidation catalyst 226 via the first fluid conduit 264 when ammonia source 240 produces or generates quantities of ammonia in excess of the ammonia delivered or directed to ammonia-SCR catalyst 230 for $NO_x$ reduction. The ammonia directed through the first valve 258 is generally gaseous ammonia 250. For example, gaseous ammonia 250 may be directed through the first valve 258 to the diesel oxidation catalyst 226 via the first fluid conduit 264 when there is excess ammonia, i.e., more ammonia available from the ammonia source 240 than is to be metered into the conduit 204 for use by the ammonia-SCR catalyst 230 in $NO_x$ reduction. In other embodiments, the ammonia directed through the first valve 258 may include liquid ammonia 248 and/or gaseous ammonia 250.

The second valve 260 may be used to meter the ammonia to the ammonia-SCR catalyst 230. The ammonia directed through the second valve 260 is generally liquid ammonia 248. For example, liquid ammonia 248 may be directed through the second valve 260 to the ammonia-SCR catalyst 230 via the second fluid conduit 266. In other embodiments, the ammonia directed through the second valve 260 may include liquid ammonia 248 and/or gaseous ammonia 250.

The third valve 262 may be used to direct the ammonia to the ammonia-SCR catalyst 230 via the third fluid conduit 268. The ammonia directed through the third valve 262 is generally gaseous ammonia 250. For example, gaseous ammonia 250 may be directed through the third valve 262 to the ammonia-SCR catalyst 230 via the third fluid conduit 268. In other embodiments, the ammonia directed through the third valve 262 may include liquid ammonia 248 and/or gaseous ammonia 250.

The first valve 258, second valve 260, third valve 262, or combinations thereof may be mechanically controlled, electrically controlled, otherwise controlled, or combinations thereof. In some embodiments, the valves 258, 260, 262 may be in electronic communication with the electronic control device 280. The electronic control device 280 may be in further electronic communication with a first pressure sensor 212, a first temperature sensor 213, a second pressure sensor 216, a second temperature sensor 217, a third pressure sensor 254, a third temperature sensor 255, or combinations thereof.

The first and/or second pressure and/or temperature sensors 212, 213, 216, 217 may be configured to measure and/or report on pressure and/or temperature characteristics at various locations within the exhaust flow. The first pressure and/or temperature sensors 212, 213 may be located upstream of at least a portion of the diesel oxidation catalyst 226. The second pressure and/or temperature sensors 216, 217 may be located upstream of at least a portion of the ammonia-SCR catalyst 230 and downstream of the diesel oxidation catalyst 226. The third pressure and/or temperature sensors 254, 255 may be configured to measure and/or report on pressure and/or temperature characteristics near the ammonia source 240.

In embodiments where at least one valve 258, 260, 262 is at least partially electronically controlled, the electronic control device 280 may regulate at least one valve 258, 260, 262 based on at least one measurement determined by at least one of the pressure and/or temperature sensors 212, 213, 216, 217, 254, 255. For example, the second valve 260 may be regulated based on a pressure and/or temperature measurement from the third pressure and/or temperature sensors 254, 255, a pressure and/or temperature measurement from the second pressure and/or temperature sensors 216, 217, a pressure and/or temperature measurement from the first pressure and/or temperature sensors 212, 213, other metrics, or combinations thereof. The first and/or second valves 258, 260 may be similarly and/or otherwise regulated.

The electronic control device 280 may include a processor 282. The processor 282 may be in electronic communication with an I/O system 286. The I/O system 286 may be in electronic communication with the various sensors 212, 213, 216, 217, 254, 256, valves 258, 260, other system components, or combinations thereof.

Memory 284 may be in electronic communication with the processor 282. The memory 284 may include directing software 288. The directing software 288 may include instructions executable to perform at least portions of the functions described herein.

Figure 4:
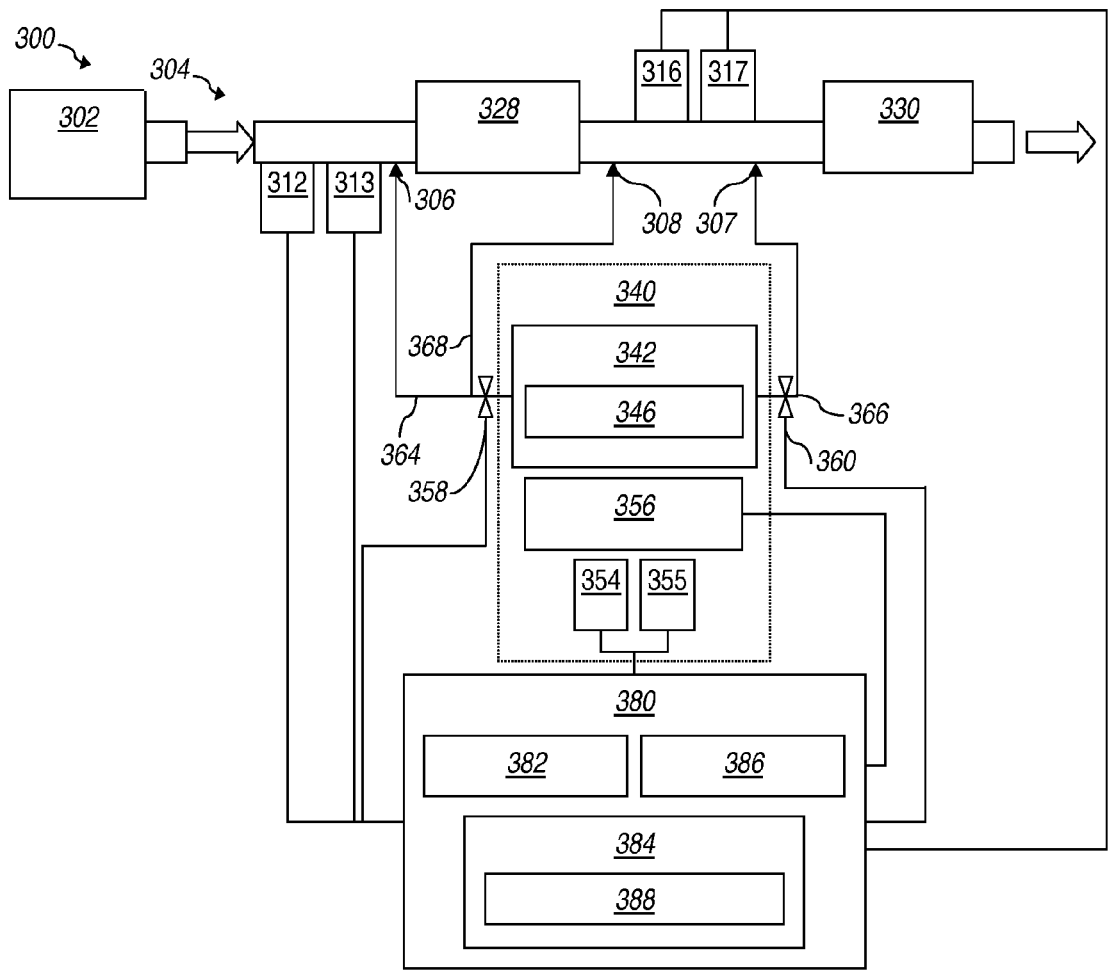
FIG. 4 is a diagrammatic illustration of an exhaust system according to a still further example embodiment of the present disclosure.

Turning to FIG. 4, illustrated is a diagrammatic illustration of an exhaust system 300 according to a still further example embodiment. The exhaust system 300 of this other embodiment may be functionally similar to the exhaust systems 1, 100, 200 previously described above and shown in FIGS. 1-3 in most respects, wherein certain features will not be described in relation to this embodiment wherein those components may function in the manner as described above and are hereby incorporated into this alternative embodiment described below. Like structures and/or components may be given like reference numerals.

Additionally, the exhaust system 200 may perform or be used to perform at least one act of the methods 400, 500, 600 described below in connection with FIGS. 5-7.

The illustrated exhaust system 300 includes a catalyzed diesel particulate filter 328, an ammonia-SCR catalyst 330, and an ammonia source 340. The exhaust system 300 may also include a conduit 304 in fluid communication with an engine 302 to direct exhaust components from the engine 302 into the exhaust system 300 for reduction of $NO_x$. Exhaust passes over and/or through the catalyzed diesel particulate filter 328 and the ammonia-SCR catalyst 330 before exiting the exhaust system 300. In some embodiments, the exhaust system 300 may include an electronic control device 380 to control delivery or directing of quantities of ammonia from the ammonia source 340 toward the ammonia-SCR catalyst 330 to reduce $NO_x$ and/or to catalyzed diesel particulate filter 328 to convert ammonia to $NO_x$ when the ammonia source 340 produces ammonia in excess of that used by the ammonia-SCR catalyst 330 to reduce $NO_x$ in the exhaust from the engine 302.

The conduit 304 may be in fluid communication with the catalyzed diesel particulate filter 328, the ammonia-SCR catalyst 330, other exhaust system components, or combinations thereof. The catalyzed diesel particulate filter 328 may be disposed downstream from the engine 302 or other $NO_x$ source.

The ammonia source 340 may include an ammonia storage vessel 342 that may store ammonia salts 346. The ammonia storage vessel 342 may also include a heat source 356, other elements, or combinations thereof. The ammonia storage vessel 342 may store the ammonia salts 346 and/or the ammonia produced by the ammonia salts 346. For instance, the ammonia salts 346 may produce ammonia by being heated by the heat source 356. The ammonia directed into the exhaust system 300 may be directed from the ammonia source 340 to the exhaust system 300 in gaseous form. Gaseous ammonia delivery from the ammonia source 340 may be different in some ways from the liquid ammonia delivery from the ammonia source 240 described in connection with FIG. 3.

The catalyzed diesel particulate filter 328 may be configured to reduce carbon monoxide, hydrocarbons, particulates, other exhaust components, or combinations thereof to carbon dioxide, water, other components, or combinations thereof. The catalyzed diesel particulate filter 328 may further be configured to convert or aid in the conversion of at least a portion of the ammonia introduced to the catalyzed diesel particulate filter 328 into $NO_x$. For example, the catalyzed diesel particulate filter 328 may be used to convert the ammonia to NO or $NO_2$ when the ammonia source 340 produces or generates quantities of ammonia in excess of the ammonia delivered or directed to ammonia-SCR catalyst 330 for $NO_x$ reduction. The catalyzed diesel particulate filter 328 may include materials such as platinum, palladium, rhodium, other platinum group metals, other materials of comparable functionality, such as, but not limited to, materials capable of aiding in converting ammonia to $NO_x$, or combinations thereof. The catalyzed diesel particulate filter 328 may be in fluid communication with the ammonia-SCR catalyst 330.

The ammonia source 340 may be in selective fluid communication with the conduit 304 through at least one ammonia inlet 306, 307, 308. The first ammonia inlet 306 may be located upstream of at least a portion of the catalyzed diesel particulate filter 328. For example, the first ammonia inlet 306 may be positioned within conduit 304 or at some location along the length of the catalyzed diesel particulate filter 328. The second ammonia inlet 307 may be located upstream of at least a portion of the ammonia-SCR catalyst 330 or at some location along the length of the ammonia-SCR catalyst 330. The third ammonia inlet 308 may be located upstream of at least a portion of the ammonia-SCR catalyst 330 and optionally within conduit 304. The ammonia source 340 may be in selective fluid communication with the first, second, or third ammonia inlet 306, 307, 308 through a first, second, or third fluid conduit 364, 366, 368.

Fluid communication through the fluid conduits 364, 366, 368 may be regulated using at least one valve 358, 360 or other fluid regulator. The valves 358, 360, 362 and/or the configuration of fluid conduits 364, 366, 368, such as diameter, cross-sectional configuration, etc., can regulate ammonia delivered to the conduit 304, the catalyzed diesel particulate filter 328, and/or the ammonia-SCR catalyst 330 for exhaust $NO_x$ reduction and/or conversion of excess ammonia to $NO_x$. Fluid communication between the ammonia source 340 and the first and/or third ammonia inlet 306, 308 via the first and/or third fluid conduit 364, 368 may be regulated by at least the first valve 358.

The first valve 358 may be used to direct the ammonia to the catalyzed diesel particulate filter 328 via the first fluid conduit 364 and/or to the ammonia-SCR catalyst 330 via the third fluid conduit 368 when ammonia source 340 produces or generates quantities of ammonia in excess of the ammonia delivered or directed to ammonia-SCR catalyst 330 via second fluid conduit 366 for $NO_x$ reduction. The second valve 360 may be used to meter the ammonia to the ammonia-SCR catalyst 330. The first valve 358 and/or the second valve 360 may be mechanically controlled, electrically controlled, otherwise controlled, or combinations thereof.

In some embodiments, the valves 358, 360 may be an electronic communication with the electronic control device 380. The electronic control device 380 may be in further electronic communication with a first pressure sensor 312, a first temperature sensor 313, a second pressure sensor 316, a second temperature sensor 317, a third pressure sensor 354, a third temperature sensor 355, or combinations thereof.

The first and/or second pressure and/or temperature sensors 312, 313, 316, 317 may be configured to measure and/or report on pressure and/or temperature characteristics at various locations within the exhaust flow. The first pressure and/or temperature sensors 312, 313 may be located upstream of at least a portion of the catalyzed diesel particulate filter 328. The second pressure and/or temperature sensors 316, 317 may be located upstream of at least a portion of the ammonia-SCR catalyst 330 and downstream of the catalyzed diesel particulate filter 328. The third pressure and/or temperature sensors 354, 355 may be configured to measure and/or report on pressure and/or temperature characteristics near the ammonia source 340.

In embodiments where at least one valve 358, 360 is at least partially electronically controlled, the electronic control device 380 may regulate at least one valve 358, 368 based on at least one measurement determined by at least one of the pressure and/or temperature sensors 312, 313, 316, 317, 354, 355. Other valves may be similarly and/or otherwise regulated.

The electronic control device 380 may include a processor 382. The processor 382 may be in electronic communication with an I/O system 386. The I/O system 386 may be in electronic communication with the various sensors 312, 313, 316, 317, 354, 356, valves 358, 360, other system components, or combinations thereof.

Memory 384 may be in electronic communication with the processor 382. The memory 384 may include directing software 388. The directing software 388 may include instructions executable to perform at least portions of the functions described herein.

The ammonia salts 346 may produce significant quantities of gaseous ammonia compared to the liquid ammonia 248 used in the system 200 described in connection with FIG. 3. For example, typically liquid ammonia sources, such as urea, include about thirty percent ammonia. Thus, the ammonia salts 346 are much more likely to produce larger quantities of excess ammonia than a liquid ammonia source.

INDUSTRIAL APPLICABILITY

The disclosed systems and/or methods for treating exhaust gases in an exhaust system could be used with any power plant, engine, hydrocarbon burning system, or other $NO_x$ producing system. The disclosed systems and/or methods may reduce the amount of $NO_x$ exiting the exhaust system, while reducing the amount of ammonia that may exit an exhaust system as ammonia when needed. For instance, if an ammonia source produces more ammonia than an ammonia-selective catalytic reduction (SCR) catalyst (including a urea-SCR catalyst) is capable of storing, converting, consuming, otherwise preventing from exiting the exhaust system, or combinations thereof, the excess ammonia may be directed toward an ammonia-to-$NO_x$ catalyst and/or other system components to reduce the amount of excess ammonia that may exit the exhaust system as ammonia. At least a portion of the excess ammonia may be directed toward an ammonia-to-$NO_x$ catalyst to be converted to $NO_x$, thereby reducing the quantity of ammonia incident upon the ammonia-SCR catalyst.

Because the purpose of typical exhaust systems is to reduce $NO_x$ emissions, directing ammonia 44 to an ammonia-to-$NO_x$ catalyst 20 to produce $NO_x$ may be generally considered undesirable. However, allowing ammonia 44 to exit the exhaust system 1 (ammonia slippage) may be even less desirable because ammonia may be more readily detected than $NO_x$ and/or may be less desirable than $NO_x$ in similar quantities. Thus, it may be more desirable to direct the excess ammonia 44 to the ammonia-to-$NO_x$ catalyst 20 (converting at least a portion of the ammonia 44 to $NO_x$) than only to direct excess ammonia 44 to the ammonia-SCR catalyst 30 for conversion and/or storage (potentially slipping the ammonia 44 out of the exhaust system 1).

Figure 5:
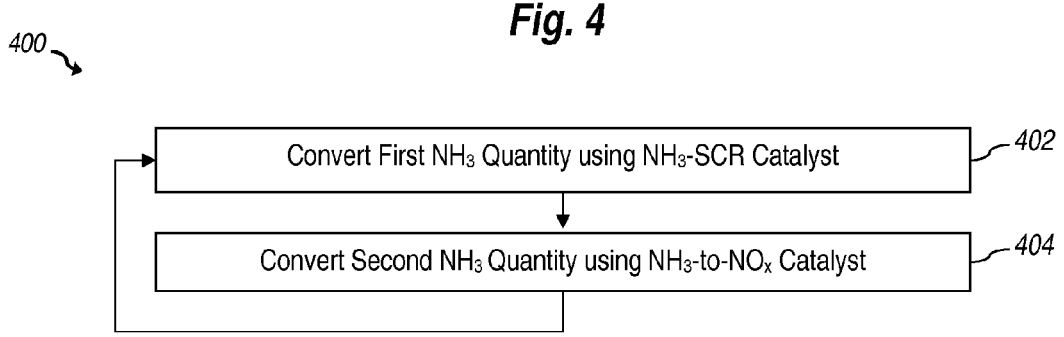
FIG. 5 is a diagrammatic illustration of method for treating exhaust gases according to an example embodiment of the present disclosure.

FIG. 5 is a diagrammatic illustration of a method 400 for treating exhaust gases according to an example embodiment. In the present embodiment, the method 400 may be used in conjunction with at least one component of the systems 1, 100, 200, 300 described in connection with FIGS. 1-4. For instance, the ammonia-to-$NO_x$ catalyst may be incorporated into a diesel oxidation catalyst (shown in FIG. 3) or a catalyzed diesel particulate filter (shown in FIG. 4). At least a portion of the method 400 may be executed mechanically, electrically, manually, otherwise, or combinations thereof. Additionally, the method 400 may perform or be used to perform at least one at least one act of the methods 500, 600 described below in connection with FIGS. 6-7.

A first ammonia quantity may be converted using the ammonia-SCR catalyst, which may produce gaseous ammonia and water, as represented by block 402. The first ammonia quantity may be produced by an ammonia source (such as ammonia source 40, 140, 240, 340). For example, the first ammonia quantity may be produced by an ammonia salt (such as ammonia salts 346) and/or liquid ammonia (such as liquid ammonia 248). The first ammonia quantity may be directed from the ammonia source upstream of at least a portion of the ammonia-SCR catalyst through a valve (such as the second valve 160, 260, 360), through a fluid conduit (such as the second fluid conduit 166, 266, 366), through an inlet (such as the second ammonia inlet 7, 107, 207, 307) into the exhaust system, to the ammonia-SCR catalyst, or combinations thereof.

The ammonia directed into an exhaust system may include various quantities of ammonia. Quantities of ammonia may include amounts, portions, other measurements, or combinations thereof. The first ammonia quantity may include approximately the amount of ammonia that can be adsorbed (stored on the outer surface of the catalyst) by an ammonia-SCR catalyst (such as ammonia-SCR catalysts 30, 130, 230, 330) and/or reacted with the $NO_x$ passing over and/or through the ammonia-SCR catalyst.

The first ammonia quantity may also include a determined ammonia slippage amount. The determined slippage amount may include the amount of the ammonia that is not adsorbed by the ammonia-SCR catalyst and/or reacted with the $NO_x$ passing over and/or through the ammonia-SCR catalyst. For example, the determined slippage amount may be about 2 ppm, about 4 ppm, about 10 ppm, and/or other slippage amounts.

The first ammonia quantity may vary depending on operating conditions of the ammonia-SCR catalyst. For example, the first ammonia quantity may be greater for a greater temperature upstream of at least a portion of the ammonia-SCR. In another example, the first ammonia quantity may be smaller based on the time in operation of a particular ammonia-SCR catalyst.

A second ammonia quantity may be converted using the ammonia-to-$NO_x$ catalyst, as represented by block 404. The second quantity of ammonia may be produced by an ammonia source. For example, the second quantity of ammonia may be produced by an ammonia salt and/or liquid ammonia. In embodiments where the ammonia source includes liquid ammonia, the second quantity of ammonia may be gaseous and/or liquid. The second ammonia quantity may be directed from the ammonia source upstream of at least a portion of the ammonia-to-$NO_x$ catalyst through a valve (such as the first valve 158, 258, 358), through a fluid conduit (such as the first fluid conduit 64, 164, 264, 364), through an inlet into the exhaust system (such as the first ammonia inlet 6, 106, 206, 306), to the ammonia-to-$NO_x$ catalyst (such as ammonia-to-$NO_x$ catalyst 20, 120, 220, 320), or combinations thereof.

A second ammonia quantity may include at least a portion of an excess ammonia quantity. Excess ammonia quantities may include any amount of ammonia that is greater than the first ammonia quantity (optionally including the determined slippage amount). For example, if an ammonia source generates more ammonia than the first ammonia quantity, the remaining ammonia generated by the ammonia source may be considered an excess ammonia quantity.

Excess ammonia quantities may be produced by changes in the environment near the ammonia source. For example, if the ammonia source is heated above a certain temperature, the ammonia source may produce excess ammonia quantities. In another instance, malfunction of at least one exhaust system component, such as a valve (shown as valves 158, 160, 258, 260, 262, 358, 360 in FIGS. 2-4), may produce excess ammonia quantities.

The first and second ammonia quantities may vary in proportion. For example, a first ammonia quantity may be smaller than a second ammonia quantity. The ratios of the first ammonia quantity and the second ammonia quantity may vary based on various factors. For instance, temperature may affect the amount of ammonia that the ammonia-SCR catalyst is capable of converting and/or storing.

The following exemplary ranges may apply to at least one embodiment described herein. Where the temperature of the exhaust flow is greater than about 400° C., the first ammonia quantity may be about 40% of the total amount of ammonia directed toward an exhaust system and the second ammonia quantity may be about 60% of the total amount of ammonia directed toward the exhaust system. Where the temperature of the exhaust flow is about 300° C., the first ammonia quantity may be about 30% of the total amount of ammonia directed toward an exhaust system and the second ammonia quantity may be about 70% of the total amount of ammonia directed toward the exhaust system. Where the temperature of the exhaust flow is about 200° C., the first ammonia quantity may be about 20% of the total amount of ammonia directed toward an exhaust system and the second ammonia quantity may be about 80% of the total amount of ammonia directed toward the exhaust system. Where the temperature of the exhaust flow is below about 200° C., the second ammonia quantity may be about 100% of the total amount of ammonia directed toward the exhaust system. These ratios may substantially limit the amount of $NO_x$ and/or ammonia that exits the exhaust system. These and/or other ratios may be determined empirically and/or by predictive modeling of an exhaust system. Other factors, such as the exhaust flow itself (i.e. whether the exhaust is flowing or stagnant), the density of the ammonia being directed, or other factors may affect these ratios by, for example, about 20%, more than 20%, or less than 20%.

These ratios and/or other ratios may be determined based on model based controls, empirical data, or other methods. For example, model based controls, similar to those used for typical ammonia-SCR operation, may be used to determine the ammonia amounts.

Figure 6:
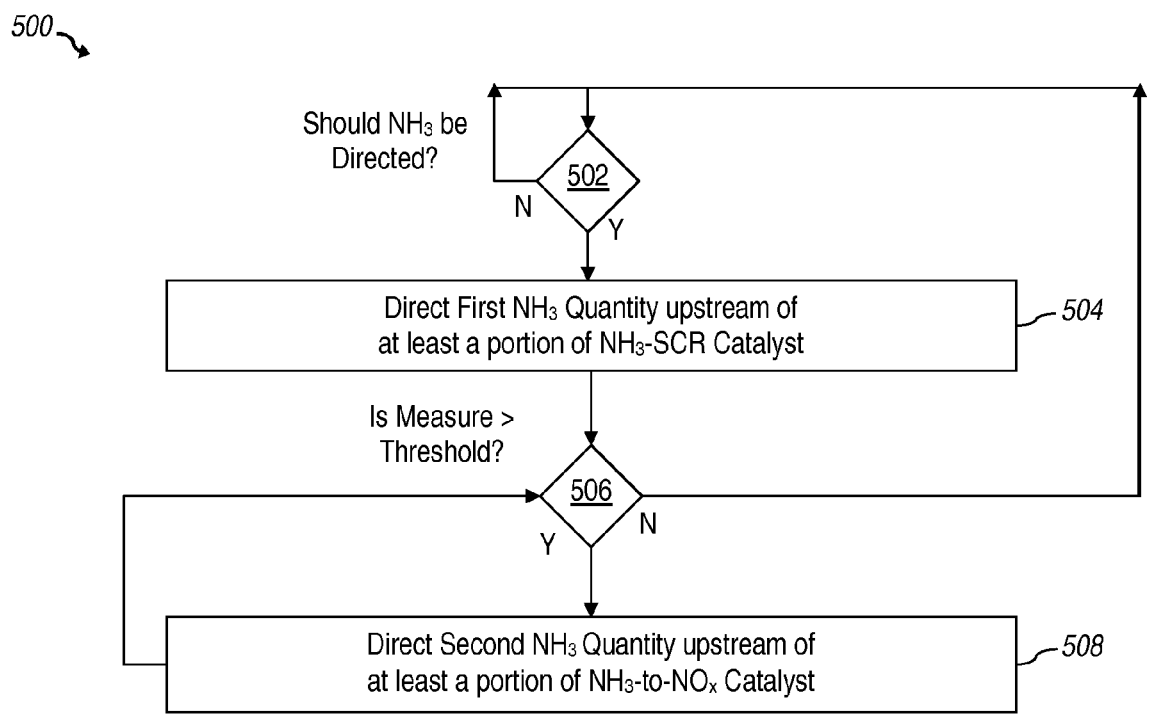
FIG. 6 is a diagrammatic illustration of method for treating exhaust gases according to another example embodiment of the present disclosure.

FIG. 6 is a diagrammatic illustration of a method 500 for treating exhaust gases according to another example embodiment. In the present embodiment, the method 500 may be used in conjunction with at least one component of the systems 1, 100, 200, 300 and/or acts of the method 400 described in connection with FIGS. 1-4 and 5, respectively. For example, the first and second valves (shown in FIGS. 2-4) may be used to direct ammonia into the exhaust system. At least a portion of the method 500 may be stored as executable instructions in the directing software (shown in FIGS. 3-4). At least a portion of the method 500 may be executed mechanically, electrically, manually, otherwise, or combinations thereof. Additionally, the method 500 may perform or be used to perform at least one act of the method 600 described below in connection with FIG. 7.

A determination may be made whether a first ammonia quantity should be directed, as represented by block 502. For instance, it may be determined whether the engine (such as engines 102, 202, 302) is running, whether the exhaust gases include $NO_x$, whether an ammonia-SCR catalyst (such as ammonia-SCR catalysts 30, 130, 230, 330 shown in FIGS. 1-4) has storage capacity, other factors, or combinations thereof.

If it is determined that a first ammonia quantity should not be directed, then the method 500 may proceed to continue to determine whether a first ammonia quantity should be directed. If it is determined that a first ammonia quantity should be directed, then the method 500 may proceed to direct the first ammonia quantity upstream of at least a portion of the ammonia-SCR catalyst, as represented by block 504. The first quantity of ammonia may be produced by an ammonia source. For example, the first quantity of ammonia may be produced by an ammonia salt and/or liquid ammonia. The first ammonia quantity may be directed from the ammonia source upstream of at least a portion of the ammonia-SCR catalyst, such as within a conduit or at some location along the length of the ammonia-SCR catalyst, through a valve (such as the second valve 160, 260, 360), through a fluid communicator (such as the second fluid conduit 66, 166, 266, 366), through an inlet (such as the second ammonia inlet 7, 107, 207, 307) into the exhaust system, upstream of at least a portion of the ammonia-SCR catalyst (such as ammonia-SCR catalyst 30, 130, 230, 330), or combinations thereof. The ammonia-SCR catalyst may be used to convert the first ammonia quantity to gaseous ammonia and water.

A determination may be made whether a measurement exceeds a threshold, as represented by block 506. For instance, it may be determined whether a pressure and/or temperature near the ammonia source (such as ammonia source 40, 140, 240, 340) exceeds a determined and/or predetermined threshold which would result in excess ammonia being available for delivery or directing to the ammonia-SCR catalyst. In one example, if a heater or other exhaust component malfunctions, a pressure and/or temperature near the ammonia source (such as in the ammonia storage vessel 242, 342) may exceed a threshold, potentially producing and/or introducing more ammonia into the exhaust system than the ammonia-SCR catalyst is capable of converting with $NO_x$ and/or storing on the ammonia-SCR catalyst to enter the exhaust system. In another example, if a fire or other catastrophe occurs, a pressure and/or temperature near the ammonia source (such as in the ammonia storage vessel 242, 342) may exceed a threshold and/or exhaust system components (such as the electronic control device 180, 280, 380) may malfunction potentially producing and/or introducing more ammonia into the exhaust system more ammonia than the ammonia-SCR catalyst is capable of converting with $NO_x$ and/or storing on the ammonia-SCR catalyst to enter the exhaust system.

If it is determined that the measurement does not exceed the threshold, then the method 500 may proceed to determine whether a first ammonia quantity should be directed. If it is determined that the measurement exceeds the threshold, then the method 500 may proceed to direct a second ammonia quantity upstream of at least a portion of the ammonia-to-$NO_x$ catalyst, as represented by block 508. The ammonia-to-$NO_x$ catalyst may be used to convert the second ammonia quantity to $NO_x$. The second quantity of ammonia may be produced by an ammonia source. For example, the second quantity of ammonia may be produced by an ammonia salt and/or liquid ammonia. In embodiments where the ammonia source includes liquid ammonia, the second quantity of ammonia may be gaseous and/or liquid. The second ammonia quantity may be directed from the ammonia source upstream of at least a portion of the ammonia-to-$NO_x$ catalyst through a valve (such as the first valve 158, 258, 358), through a fluid conduit (such as the first fluid conduit 64, 164, 264, 364), through an inlet into the exhaust system (such as the first ammonia inlet 6, 106, 206, 306), to the ammonia-to-$NO_x$ catalyst (such as ammonia-to-$NO_x$ catalyst 20, 120, 220, 320), or combinations thereof. After the second ammonia quantity is directed upstream of at least a portion of the ammonia-to-$NO_x$ catalyst, it may again be determined whether a measurement exceeds a threshold.

Figure 7:
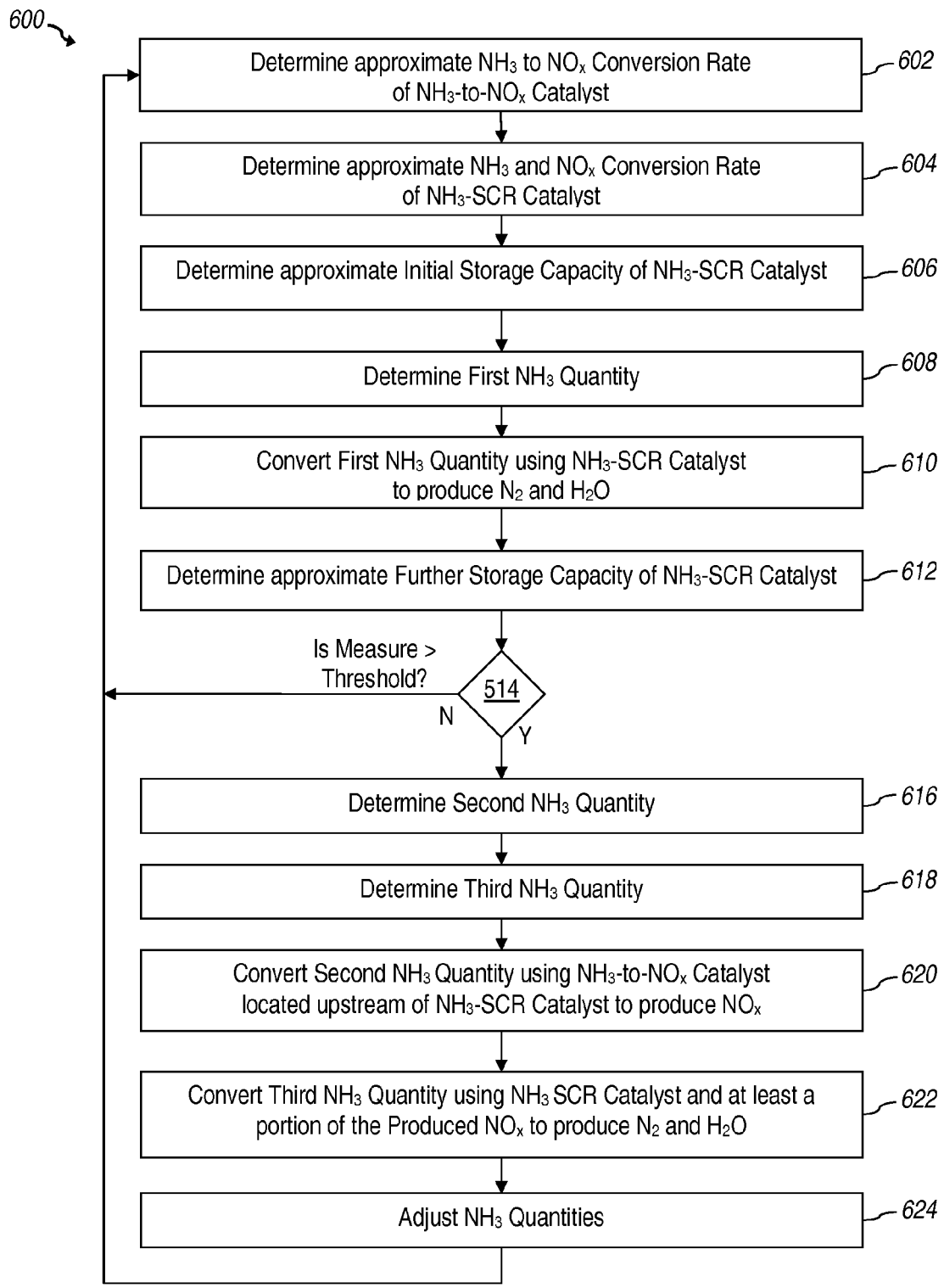
FIG. 7 is a diagrammatic illustration of method for treating exhaust gases according to a further example embodiment of the present disclosure.

FIG. 7 is a diagrammatic illustration of a method 600 for treating exhaust gases according to another example embodiment. In the present embodiment, the method 600 may be used in conjunction with at least one component of the systems 1, 100, 200, 300 and/or acts of the methods 400, 500 described in connection with FIGS. 1-4 and 5-6, respectively. For example, the first valves, second valves, third valves, or combinations thereof (shown in FIGS. 2-4) may be used to direct ammonia into the exhaust system. At least a portion of the method 600 may be stored as executable instructions in the directing software (shown in FIGS. 3 and 4). At least a portion of the methods 600 may be executed mechanically, electrically, manually, otherwise, or combinations thereof.

The method 600 may include determining the approximate ammonia-to-$NO_x$ conversion rate of the ammonia-to-$NO_x$ catalyst, as represented by block 602. The approximate ammonia-to-$NO_x$ conversion rate may be determined based on the upstream pressure and/or temperature of the exhaust flow, the catalyst and/or substrate material used in the ammonia-to-$NO_x$ catalyst, predicted exhaust components (i.e. amounts of hydrocarbons, carbon monoxide, or other exhaust components), exhaust flow rate, oxygen availability, other information, or combinations thereof. These and/or other values may be determined empirically and/or by predictive modeling of an exhaust system.

The approximate ammonia and $NO_x$ conversion rate of the ammonia-SCR catalyst may be determined, as represented by block 604. The approximate conversion rate of the ammonia-SCR catalyst may be determined based on the upstream pressure and/or temperature, the catalyst and/or substrate material used in the ammonia-SCR catalyst, predicted exhaust components (including the predicted amount of $NO_x$ converted by the ammonia-to-$NO_x$ catalyst based on the determined approximate ammonia-to-$NO_x$ conversion rate), other information, or combinations thereof.

The approximate initial storage capacity of the ammonia-SCR catalyst may be determined, as represented by block 606. The approximate initial storage capacity of the ammonia-SCR catalyst may be determined based on the upstream pressure and/or temperature, the catalyst material used in the ammonia-SCR catalyst, the substrate material used in the ammonia-SCR catalyst, the conversion rate of the ammonia-SCR catalyst, predicted exhaust components (including the predicted amount of $NO_x$ converted by the ammonia-to-$NO_x$ catalyst based on the determined approximate ammonia-to-$NO_x$ conversion rate), other information, or combinations thereof. Typically, the storage capacity will vary based on the temperature of the exhaust flow with higher storage capacities at lower temperatures. The catalyst and/or substrate material may affect the magnitude of the storage capacity. These and/ or other values may be determined empirically and/or by predictive modeling of an exhaust system.

A first quantity of ammonia may be determined, as represented by block 608. The first quantity of ammonia may be determined based on the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, upstream pressure and/or temperature, other factors, or combinations thereof.

The first ammonia quantity may be converted using the ammonia-SCR catalyst, as represented by block 610. The ammonia-SCR catalyst may be used to convert the first ammonia quantity to gaseous ammonia and water. The first quantity of ammonia may be produced by an ammonia source. For example, the first quantity of ammonia may be produced by an ammonia salt and/or liquid ammonia. The first ammonia quantity may be directed from the ammonia source upstream of at least a portion of the ammonia-SCR catalyst through a valve (such as the second valve 160, 260, 360), through a fluid conduit (such as the second fluid conduit 66, 166, 266, 366), through an inlet (such as the second ammonia inlet 7, 107, 207, 307) into the exhaust system, to the ammonia-SCR catalyst (such as ammonia-SCR catalyst 30, 130, 230, 330), or combinations thereof.

The approximate further capacity of the ammonia-SCR catalyst may be determined, as represented by block 612. The approximate further capacity of the ammonia-SCR catalyst may be determined based on the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, upstream pressure and/or temperature, the amount of the first ammonia quantity determined and/or delivered to the ammonia-SCR catalyst, other factors, or combinations thereof.

Excess ammonia quantities may include any amount of ammonia that is greater than the first ammonia quantity (optionally including the determined slippage amount). The excess ammonia quantity may be divided into smaller quantities. The excess ammonia quantity may be divided into a second quantity, a third quantity, and/or more quantities.

A determination may also be made whether a measurement exceeds a threshold, as represented by block 614. For instance, it may be determined whether a pressure and/or temperature near the ammonia source (such as ammonia source 40, 140, 240, 340) exceeds a determined and/or predetermined threshold. In one example, if a heater or other exhaust component malfunctions, a pressure and/or temperature near the ammonia source (such as in the ammonia storage vessel 242, 342) may exceed a threshold, potentially producing and/or introducing more ammonia into the exhaust system than the ammonia-SCR catalyst is capable of converting with $NO_x$ and/or storing on the ammonia-SCR catalyst to enter the exhaust system. In another example, if a fire or other catastrophe occurs, a pressure and/or temperature near the ammonia source (such as in the ammonia storage vessel 242, 342) may exceed a threshold and/or exhaust system components (such as the electronic control device 180, 280, 380) may malfunction potentially producing and/or introducing more ammonia into the exhaust system more ammonia than the ammonia-SCR catalyst is capable of converting with $NO_x$ and/or storing on the ammonia-SCR catalyst to enter the exhaust system.

If it is determined that the measurement does not exceed the threshold, then the method 600 may proceed back to repeat one or more acts associated with blocks 602-612. In the present embodiment, the method 600 may proceed to determine the approximate ammonia-to-$NO_x$ conversion rate of the ammonia-to-$NO_x$ catalyst if the measurement does not exceed the threshold.

If it is determined that the measurement exceeds the threshold, then a second ammonia quantity may be determined, as represented by block 616. The second quantity of ammonia may be determined based on the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, the further storage capacity of the ammonia-SCR catalyst, upstream pressure and/or temperature, other factors, or combinations thereof.

A third quantity of ammonia may be determined, as represented by block 618. The third quantity of ammonia may be determined based on the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, the further storage capacity of the ammonia-SCR catalyst, upstream pressure and/or temperature, other factors, or combinations thereof.

In some embodiments, only a first and second quantity of ammonia may be determined. In other embodiments at least, a first, second, and third quantity of ammonia may be determined. In embodiments where a second and third quantity of ammonia are determined, the second quantity of ammonia and the third quantity of ammonia may be determined with respect to each other. For example, the second quantity of ammonia and the third quantity of ammonia may be determined approximately simultaneously.

The first, second, third ammonia quantity, or combinations thereof may vary in proportion. For example, a first ammonia quantity may be smaller than a second and/or third ammonia quantity. In another instance, a second ammonia quantity directed to the ammonia-to-$NO_x$ catalyst may be approximately the same as a third ammonia quantity directed to the ammonia-SCR catalyst.

The ratios of the first, second, third ammonia quantity, or combinations thereof may vary based on various factors. For instance, temperature may affect the amount of ammonia that the ammonia-SCR catalyst is capable of converting and/or storing.

The following exemplary ranges may apply to at least one embodiment described herein. Where the temperature of the exhaust flow is greater than about 400° C., the first and/or third ammonia quantity may be about 40% of the total amount of ammonia directed toward an exhaust system and the second ammonia quantity may be about 60% of the total amount of ammonia directed toward the exhaust system. For example, the combination of any ratio of first quantity and the third quantity, in embodiments where a first and a third quantity are directed, may total about 40% of the total amount of ammonia directed toward the exhaust system. Where the temperature of the exhaust flow is about 300° C., the first and/or third ammonia quantity may be about 30% of the total amount of ammonia directed toward an exhaust system and the second ammonia quantity may be about 70% of the total amount of ammonia directed toward the exhaust system. Where the temperature of the exhaust flow is about 200° C., the first and/or third ammonia quantity may be about 20% of the total amount of ammonia directed toward an exhaust system and the second ammonia quantity may be about 80% of the total amount of ammonia directed toward the exhaust system. Where the temperature of the exhaust flow is below about 200° C., the second ammonia quantity may be about 100% of the total amount of ammonia directed toward the exhaust system. These ratios may substantially limit the amount of $NO_x$ and/or ammonia that exits the exhaust system. These and/or other ratios may be determined empirically and/or by predictive modeling of an exhaust system. Other factors, such as the exhaust flow itself (i.e. whether the exhaust is flowing or stagnant), the density of the ammonia being directed, or other factors may affect these ratios by, for example, about 20%, more than 20%, or less than 20%.

These ratios and/or other ratios may be determined based on model based controls, empirical data, or other methods. For example, model based controls, similar to those used for typical ammonia-SCR operation, may be used to determine the ammonia amounts.

The second ammonia quantity may be converted using the ammonia-to-$NO_x$ catalyst, as represented by block 620. The ammonia-to-$NO_x$ catalyst may be used to convert the second ammonia quantity to $NO_x$. The second quantity of ammonia may be produced by an ammonia source. For example, the second quantity of ammonia may be produced by an ammonia salt and/or liquid ammonia. In embodiments where the ammonia source includes liquid ammonia, the second quantity of ammonia may be gaseous and/or liquid. The second ammonia quantity may be directed from the ammonia source upstream of at least a portion of the ammonia-to-$NO_x$ catalyst through a valve (such as the first valve 158, 258, 358), through a fluid conduit (such as the first fluid conduit 64, 164, 264, 364), through an inlet into the exhaust system (such as the first ammonia inlet 6, 106, 206, 306), to the ammonia-to-$NO_x$ catalyst (such as ammonia-to-$NO_x$ catalyst 20, 120, 220, 320), or combinations thereof.

The third ammonia quantity may be converted using the ammonia-SCR catalyst, as represented by block 622. The ammonia-SCR catalyst may be used to convert the third ammonia quantity to gaseous nitrogen and water. The ammonia-SCR catalyst may be used to convert the third ammonia quantity and the $NO_x$ produced by the conversion of the second ammonia quantity to $NO_x$ to gaseous ammonia and water. The third quantity of ammonia may be produced by an ammonia source. For example, the third quantity of ammonia may be produced by an ammonia salt and/or liquid ammonia. In embodiments where the ammonia source includes liquid ammonia, the third quantity of ammonia may be gaseous and/or liquid. The third ammonia quantity may be directed from the ammonia source upstream of at least a portion of the ammonia-SCR catalyst through a valve (such as the first valve 158, 258, 358 and/or second valve 160, 260, 360), through a fluid conduit (such as the third fluid conduit 168, 268, 368 and/or the second fluid conduit 66, 166, 266, 366), through an inlet into the exhaust system (such as the second ammonia inlet 7, 107, 207, 307, and/or the third ammonia inlet 108, 208, 308), to the ammonia-SCR catalyst (such as ammonia-SCR catalyst 30, 130, 230, 330), or combinations thereof.

The first quantity of ammonia, the second quantity of ammonia, the third quantity of ammonia, or combinations thereof may be adjusted, as represented by block 624. Adjusting quantities of ammonia may be based on the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, the further storage capacity of the ammonia-SCR catalyst, at least one of the first, second, and third converted ammonia quantities, upstream pressure and/or temperature, other factors, or combinations thereof. These factors may be redetermined prior to adjusting the first quantity of ammonia, the second quantity of ammonia, the third quantity of ammonia, or combinations thereof.

The acts of method 600 may be performed and/or repeated in any acceptable order. For instance, the second ammonia quantity may be converted before commencing determining the third ammonia quantity. In another example, the first ammonia quantity may be determined and/or redetermined before determining and/or redetermining the approximate ammonia-to-$NO_x$ conversion rate of the ammonia-to-$NO_x$ catalyst, the approximate ammonia and $NO_x$ conversion rate of the ammonia-SCR catalyst, the initial storage capacity of the ammonia-SCR catalyst, the further storage capacity of the ammonia-SCR catalyst, at least one of the first, second, and third directed ammonia quantities, upstream pressure and/or temperature, other factors, or combinations thereof.

Determining the approximate ammonia-to-$NO_x$ conversion rate, the approximate initial storage capacity of the ammonia-SCR catalyst, the first ammonia quantity, the second ammonia quantity, the third ammonia quantity, the approximate further storage capacity of the ammonia-SCR catalyst, or combinations thereof may be performed by an electronic control device such as electronic control devices 180, 280, 380. An electronic control device may control the direction of the first ammonia quantity upstream of at least a portion of the ammonia-SCR catalyst, the second ammonia quantity upstream of at least a portion of the ammonia-to-$NO_x$ catalyst, the third ammonia quantity upstream of at least a portion of the ammonia-SCR catalyst, or combinations thereof. Adjusting the ammonia quantities may be performed by an electronic control device.

In other embodiments, determining the approximate ammonia-to-$NO_x$ conversion rate, the approximate initial storage capacity of the ammonia-SCR catalyst, the first ammonia quantity, the second ammonia quantity, the third ammonia quantity, the approximate further storage capacity of the ammonia-SCR catalyst, or combinations thereof, and/or adjusting the ammonia quantity may be performed mechanically, manually, otherwise, or combinations thereof.

The direction of the first ammonia quantity upstream of at least a portion of the ammonia-SCR catalyst, the second ammonia quantity upstream of at least a portion of the ammonia-to-$NO_x$ catalyst, the third ammonia quantity upstream of at least a portion of the ammonia-SCR catalyst, or combinations thereof may be mechanically controlled. For example, at least the first and/or second valves 158, 258, 358, 160, 260, 360 may direct at least one of the first, second, or third ammonia quantities based on a pressure, temperature, other measurement, or combinations thereof.

When the threshold pressure, temperature, other measurement, or combinations thereof for the second valve 160, 260, 360 is reached, the first (and/or third) ammonia quantity may be determined by the amount of time that the second valve 160, 260, 360 is open. In another example, when a threshold pressure, temperature, other measurement, or combinations thereof for the second valve 160, 260, 360 is reached and a threshold pressure, temperature, other measurement, or combinations thereof for the first valve 158, 258, 358 is reached, the first ammonia quantity, second ammonia quantity, third ammonia quantity, or combinations thereof may be determined by the amount of time that the first valve 158, 258, 358 and/or second valve 160, 260, 360 are open.

Mechanically and/or electronically controlled system components may provide failsafe systems where environmental conditions, such as temperatures, exceed the optimal operating conditions of various electrically controlled components. Furthermore, mechanically controlled system components may be used in conjunction with electrically controlled components to provide a backup in case of electrical failure.

This disclosure is susceptible to various modifications and alternative components and/or acts, and specific examples thereof have been shown by way of example in the drawings and are herein described in detail. It should be understood, however, that the invention is not to be limited to the particular devices or methods disclosed, but to the contrary, the invention is to cover all modifications, equivalents, and alternatives falling within the spirit and scope of the claims.

The disclosed systems and/or methods for directing ammonia in an exhaust system could be used with any power plant, engine, hydrocarbon burning system, other $NO_x$ producing system, or combinations thereof. The disclosed systems and/or methods may reduce the amount of ammonia that may exit an exhaust system as ammonia. For instance, if an ammonia source produces more ammonia than an ammonia-SCR (including a urea-SCR) is capable of storing, converting, consuming, otherwise preventing exhausting, or combinations thereof, the excess ammonia may be directed toward an ammonia-to-$NO_x$ catalyst and/or other system components to reduce the amount of excess ammonia that may exit the exhaust system as ammonia. At least a portion of the excess ammonia may be converted to $NO_x$.

Reducing the amount of ammonia that may exit an exhaust system as ammonia may be desirable in any exhaust system that includes an ammonia source. For instance, excess ammonia that may exit an exhaust system that include an ammonia salt, liquid ammonia, other ammonia source, or combinations thereof may be reduced by the systems and/or methods described herein.

What is claimed is:

1. An exhaust system comprising:
    a conduit configured to receive combustion products from an engine;
    an ammonia-to-$NO_x$ catalyst in fluid communication with the conduit, the ammonia-to-$NO_x$ catalyst for converting a first quantity of ammonia into $NO_x$;
    a first ammonia inlet disposed upstream of at least a portion of the ammonia-to-$NO_x$ catalyst and configured to receive a first quantity of ammonia from an ammonia source and deliver the first quantity of ammonia to the ammonia-to-$NO_x$ catalyst;
    an ammonia-SCR catalyst in fluid communication with and being disposed downstream from the ammonia-to-$NO_x$ catalyst, the ammonia-SCR catalyst for converting a second quantity of ammonia and $NO_x$ into nitrogen and water; and
    a second ammonia inlet disposed downstream of the ammonia-to-$NO_x$ catalyst and upstream of at least a portion of the ammonia-SCR catalyst and configured to receive ammonia from the ammonia source and deliver the second quantity of ammonia to the ammonia-SCR catalyst.

2. The system of claim 1, further comprising a third ammonia inlet disposed downstream of the ammonia-to-$NO_x$ catalyst and upstream of at least a portion of the ammonia-SCR catalyst and configured to receive ammonia from the ammonia source.

3. The system of claim 1, wherein the ammonia-to-$NO_x$ catalyst comprises a diesel oxidation catalyst.

4. The system of claim 1, wherein the ammonia-to-$NO_x$ catalyst comprises a catalyzed diesel particulate filter.

5. The system of claim 1, wherein the catalyst of the ammonia-to-$NO_x$ catalyst includes a platinum group metal.

6. The system of claim 1, further comprising an ammonia source in selective communication with the first ammonia inlet through a first fluid conduit, the ammonia source further being in selective fluid communication with the second ammonia inlet through a second fluid conduit.

7. An exhaust system for treating exhaust gases, the system comprising:
    an ammonia-to-$NO_x$ catalyst disposed within the exhaust stream, the ammonia-to-$NO_x$ catalyst for converting a first quantity of ammonia into $NO_x$;
    an ammonia-SCR catalyst in fluid communication with and being disposed downstream from the ammonia-to-$NO_x$ catalyst, the ammonia-SCR catalyst for converting a second quantity of ammonia and $NO_x$ into nitrogen and water; and
    an ammonia source in selective fluid communication with the exhaust system upstream of at least a portion of the ammonia-to-$NO_x$ catalyst through a first fluid conduit for delivering a first quantity of ammonia to the ammonia-to-$NO_x$, the ammonia source further being in selective fluid communication with the exhaust system downstream of the ammonia-to-$NO_x$ catalyst and upstream of at least a portion of the ammonia-SCR catalyst through a second fluid conduit for delivering a second quantity of ammonia to the ammonia-SCR catalyst.

8. The system of claim 7, wherein the ammonia source is in selective fluid communication with the exhaust system downstream of the ammonia-to-$NO_x$ catalyst and upstream of at least a portion of the ammonia-SCR catalyst through a third fluid conduit.

9. The system of claim 8, further comprising a mechanical valve operatively connected to the first fluid conduit and the third fluid conduit.

10. The system of claim 8, further comprising a first mechanical valve operatively connected to the first fluid conduit and a first mechanical valve operatively connected to the third fluid conduit.

11. The system of claim 8, wherein the first fluid conduit is regulated based on a first pressure within the ammonia source.

12. The system of claim 11, wherein the second fluid conduit is regulated based on a second pressure within the ammonia source.

13. The system of claim 12, wherein the third fluid conduit is regulated based on the second pressure within the ammonia source.

14. The method of claim 7, wherein the first quantity of ammonia is gaseous and the second quantity of ammonia is liquid.

* * * * *